United States Patent [19]

Huang et al.

[11] Patent Number: 5,721,008
[45] Date of Patent: Feb. 24, 1998

[54] METHOD FOR CONTROLLING SENSOR-TO-SENSOR ALIGNMENT AND MATERIAL PROPERTIES IN A DUAL MAGNETORESISTIVE SENSOR

[75] Inventors: Fujian Huang, Pittsburgh, Pa.; James Giusti, Chanhassen; Gregory S. Mowry, Burnsville, both of Minn.

[73] Assignee: Seagate Technology, Inc., Scotts Valley, Calif.

[21] Appl. No.: 801,126

[22] Filed: Feb. 14, 1997

[51] Int. Cl.$^6$ .................................................. B05D 5/12
[52] U.S. Cl. .............. 427/123; 204/192.34; 427/130; 427/131; 427/132; 427/259; 427/264; 427/265; 427/270; 427/272; 427/282; 427/294; 427/404
[58] Field of Search .................................... 427/123, 130, 427/131, 132, 259, 264, 265, 270, 272, 282, 294, 404; 204/192.34

[56] References Cited

U.S. PATENT DOCUMENTS

| | | | |
|---|---|---|---|
| 5,079,831 | 1/1992 | Reid | 29/603 |
| 5,084,794 | 1/1992 | Smith | 360/113 |
| 5,103,553 | 4/1992 | Mallary | 29/603 |
| 5,193,038 | 3/1993 | Smith | 360/113 |
| 5,296,987 | 3/1994 | Anthony et al. | 360/113 |
| 5,309,304 | 5/1994 | Neberhuis et al. | 360/113 |
| 5,309,305 | 5/1994 | Nepela et al. | 360/113 |
| 5,323,285 | 6/1994 | Smith | 360/113 |
| 5,337,203 | 8/1994 | Kitada et al. | 360/113 |
| 5,357,388 | 10/1994 | Smith | 360/113 |
| 5,406,433 | 4/1995 | Smith | 360/113 |
| 5,434,733 | 7/1995 | Hesterman et al. | 360/113 |
| 5,442,508 | 8/1995 | Smith | 360/113 |
| 5,508,868 | 4/1996 | Cheng et al. | 360/113 |

OTHER PUBLICATIONS

Adrian J. Devasahayam and Mark H. Kryder, "A Study of the NIFe/NiMn Exchange Couple", *IEEE Transactions On Magnetics*, vol. 32, No. 5, Sep. 1996.

*Primary Examiner*—Bernard Pianalto
*Attorney, Agent, or Firm*—Westman, Champlin & Kelly, P.A.

[57] ABSTRACT

A method of fabricating a dual magnetoresistive (DMR) sensor with improved sensor-to-sensor match is disclosed. A first Mo conductor layer and a first NiMn antiferromagnetic layer are formed on top of a first gap layer in wing regions of the DMR sensor. The first NiMn layer is formed on top of the first Mo layer. A first NiFe sensor layer, a first spacer layer and a second NiFe sensor layer are deposited on top of the first NiMn layer in the wing regions and on top of the first gap layer in the active region. The first NiFe sensor layer, the first spacer layer and the second NiFe sensor layer are all deposited in a single vacuum deposition run to minimize material mismatches, and are simultaneously patterned to the desired geometry to minimize misalignment between the two sensor layers. A second conductor layer and a second antiferromagnetic layer are formed on top the second NiFe sensor layer in the wing regions.

13 Claims, 8 Drawing Sheets

METHOD FOR CONTROLLING SENSOR-TO-SENSOR ALIGNMENT AND MATERIAL PROPERTIES IN A DUAL MAGNETORESISTIVE SENSOR

BACKGROUND OF THE INVENTION

The present application claims the benefit of earlier filed U.S. Provisional application No. 60/028,497, entitled A METHOD FOR CONTROLLING SENSOR-TO-SENSOR ALIGNMENT AND MATERIAL PROPERTIES IN A DUAL MAGNETORESISTIVE SENSOR, filed on Oct. 15, 1996, now abandoned.

The present invention relates generally to magnetoresistive (MR) type sensors. More particularly, the present invention is directed toward a method for controlling sensor-to-sensor alignment and material properties in a dual magnetoresistive sensor.

Dual magnetoresistive (DMR) sensors of the type having two MR sensing elements are well known in the art. DMR sensors used in high density data storage applications require that great care be taken during fabrication to match each of the two sensor's geometries and material properties. Geometrical and/or material mismatches between the sensors can lead to performance degradations such as positive-to-negative pulse asymmetry and signal reduction. Existing DMR head fabrication techniques employ two separate process operations for the definition of the two MR sensors. These existing methods introduce a number of problems and difficulties.

A first problem introduced by existing DMR head fabrication techniques relates to the typically necessary use of separate ion mill patterning of the two MR sensors. Separate ion mill patterning of the MR sensors requires separate photolithography masking operations. This increases the probability of misalignment between the two sensors, at the back edge of the sensor, resulting in sensor height mismatch.

A second significant problem introduced by conventional DMR head fabrication techniques relates to material property mismatches between the two MR sensors. Separate deposition processes for each sensor result in material property mismatches between the sensors due to run-to-run variances of the magnetic film vacuum deposition system. The material properties referred to include, but are not limited to, saturation magnetization, anisotropy field, hard and easy axis coercivity, electrical resistivity, exchange constant, grain size, film stress and thermal conductivity. A method of fabricating DMR sensors to overcome these and other deficiencies of conventional methods would be a significant improvement in the field.

SUMMARY OF THE INVENTION

A method of fabricating a dual magnetoresistive (DMR) sensor is disclosed. A first Mo conductor layer and a first NiMn antiferromagnetic layer are formed on top of a first gap layer in wing regions of the DMR sensor. The first NiMn layer is formed on top of the first Mo layer. A first NiFe sensor layer, a spacer layer and a second NiFe sensor layer are deposited and patterned on top of the first NiMn layer in the wing regions and on top of the first gap layer in the active region. A second conductor layer and a second antiferromagnetic layer are formed on top of the second NiFe sensor layer in the wing regions.

In preferred embodiments of the present invention, the Mo conductor layer also functions as an underlayer or seedlayer for enhancing the exchange coupling between the first NiMn antiferromagnetic layer and the first NiFe sensor layer. This allows the first NiFe sensor layer to be deposited on top of the first NiMn antiferromagnetic layer, instead of vice versa as has typically been necessary in the art. This in turn allows the two NiFe sensor layers and the spacer layer to be deposited in a single vacuum deposition run which minimizes material mismatches between the two NiFe sensor layers. It also allows the two NiFe sensor layers and the spacer layer to be simultaneously patterned which minimizes misalignment between the two NiFe sensor layers.

DETAILED DESCRIPTION OF THE PREFERRED EMBODIMENTS

The present invention includes a method of producing DMR sensors in which both sensor layers of the DMR sensor are deposited within the same vacuum deposition run. Further, the desired sensor pattern is formed with one photomask and ion mill operation. Depositing the two sensors from the same target and under the same sputtering conditions minimizes variations in the film properties. Simultaneous ion mill patterning of the first sensor, a spacer, and the second sensor guarantees good alignment between the first and second sensors along the periphery of the patterned geometry which minimizes sensor height mismatch.

Figure 1:
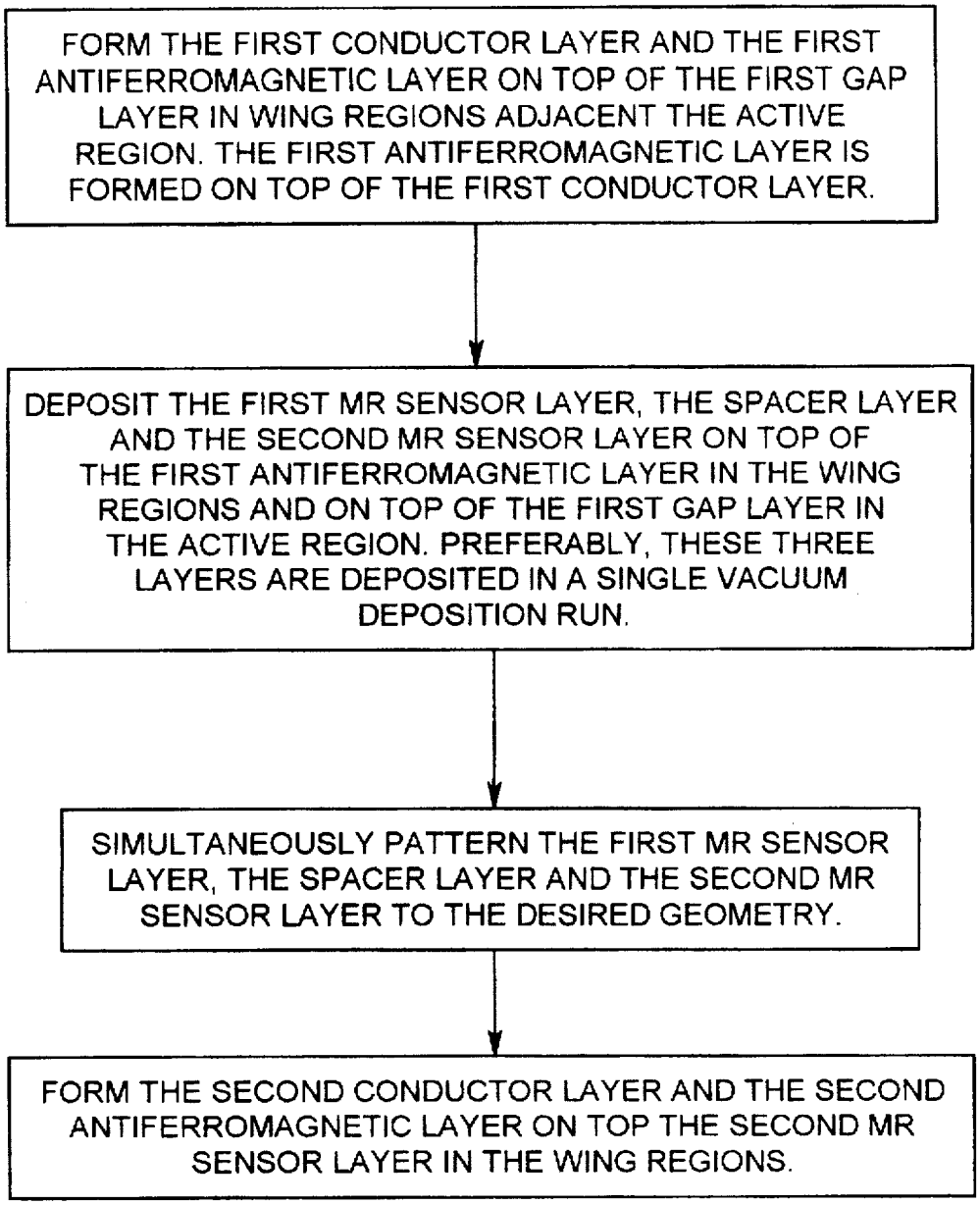
FIG. 1 is a flow diagram which illustrates preferred methods of fabricating DMR sensors, in accordance with the present invention, such that sensor-to-sensor alignment and material properties are more easily controlled.

FIG. 1 is a flow diagram illustrating a preferred method of fabricating DMR sensors in accordance with the present invention. FIGS. 2–14 illustrate various process steps of methods of the present invention, and supplement the discussion of the flow diagram of FIG. 1. The main portions of a completed DMR sensor according to the present invention are illustrated in FIG. 14.

Figure 2:
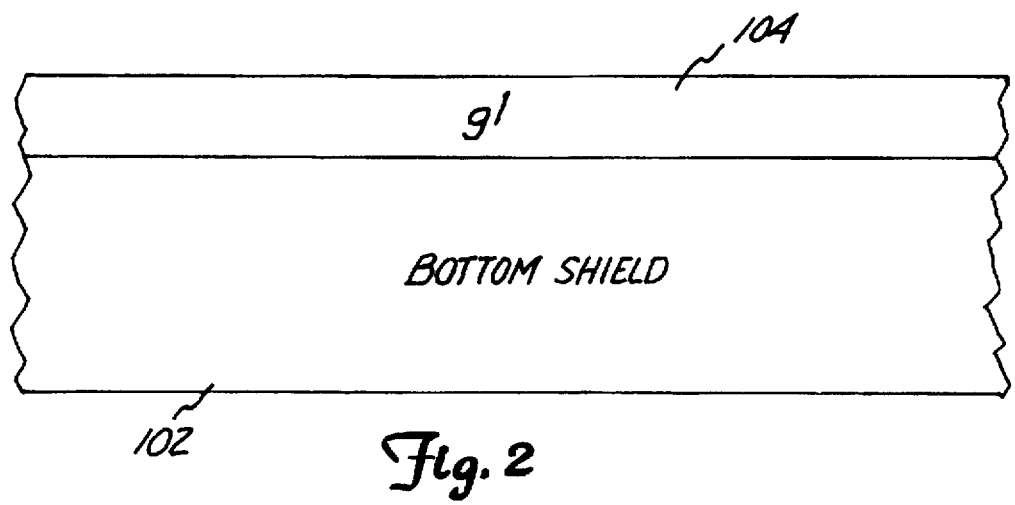
FIGS. 2,3,4,5,6,7,8,9,10,11,12 and 13 are diagrammatic views which illustrate a method of fabricating a DMR sensor in accordance with preferred embodiments of the present invention such that sensor-to-sensor alignment and material properties are more easily controlled or matched.

In fabricating DMR sensor 100 (shown in completed form in FIG. 14) in accordance with preferred embodiments of the present invention, a first insulating gap layer 104 is deposited onto bottom shield layer 102. Bottom shield 102 can be any of a variety of well known shield materials such as Sendust™ or permalloy (NiFe), and preferably has a thickness of about 2–3 µm. Gap layer 104, which is also known as the sensor-to-shield gap or the first read gap, can be formed from a wide variety of well known gap materials. In some preferred embodiments, gap layer 104 is formed from $Al_2O_3$ and has a thickness of about 900 Å to 1000 Å. Deposition of first insulating gap layer 104 on bottom shield 102 is illustrated in FIG. 2.

Figure 3:
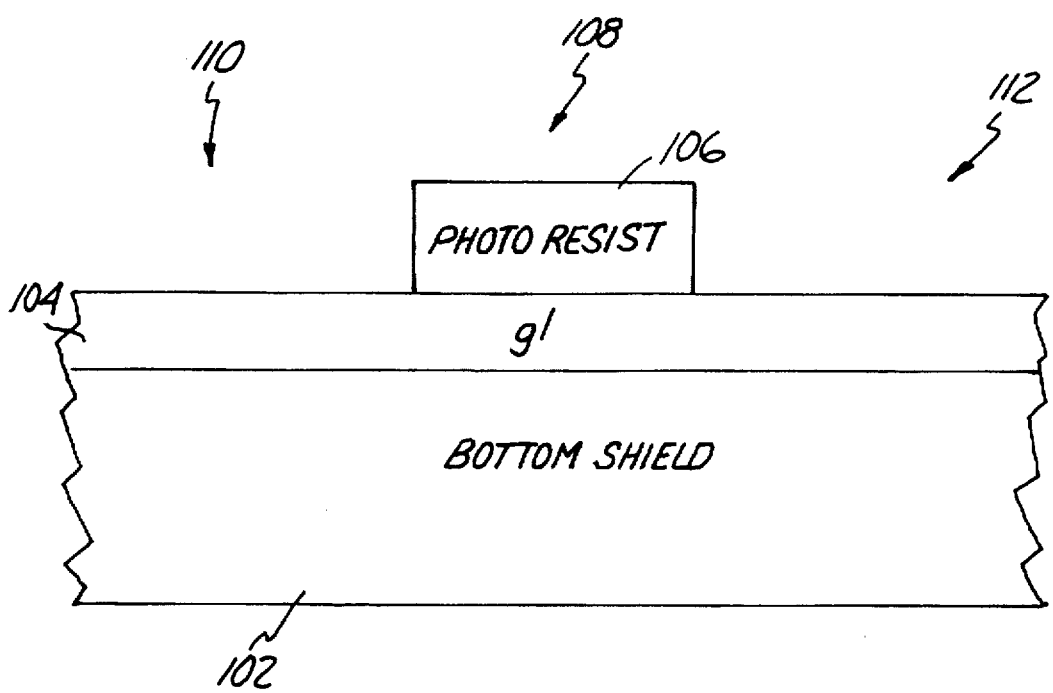
Figure 4:
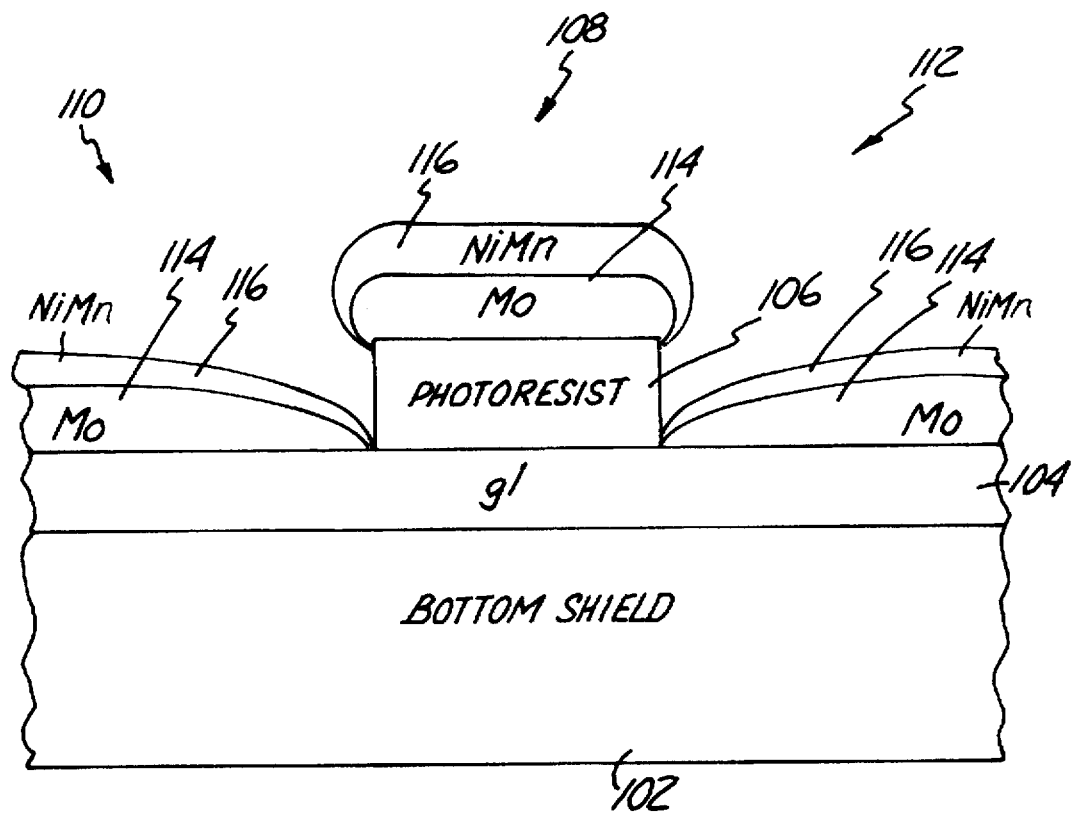
Figure 5:
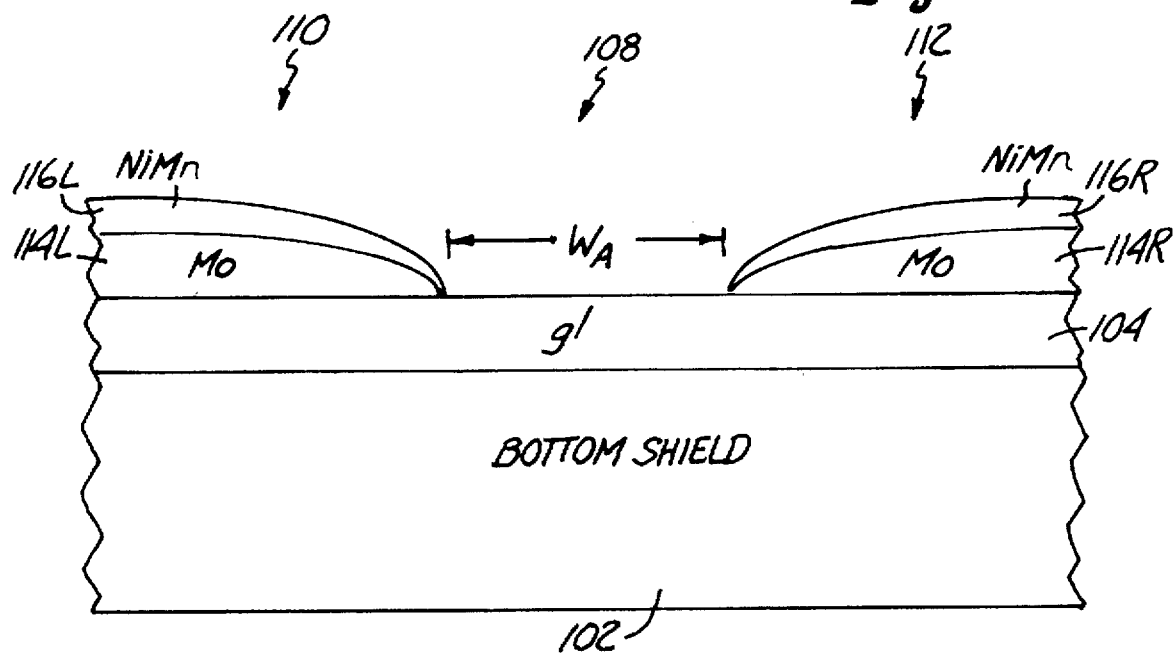

Next, a conductor metal layer and an antiferromagnetic exchange material layer are patterned on gap layer 104 using a lift-off process. This is illustrated in FIGS. 3, 4 and 5. First, photoresist 106 is coated and patterned on gap layer 104 to define a central region 108 which will eventually correspond to the active sensor region of DMR sensor 100. Placement of photoresist 106 also defines left exchange/conductor region or wing 110 and right exchange/conductor region or wing 112.

After patterning photoresist 106 in the desired location on gap layer 104, layer 114 of conductor material is deposited on top of gap layer 104 in regions 110 and 112, and over photoresist 106 in region 108. While any of a wide variety of known conductor materials can be used as layer 114, in preferred embodiments conductor layer 114 is molybdenum (Mo) and has a thickness of between about 500 Å and 1500 Å. Next, antiferromagnetic exchange layer 116 is deposited on top of conductor layer 114. While antiferromagnetic exchange layer 116 can be any of a variety of antiferromagnetic materials known for their usefulness in domain stabilization of MR sensors, in preferred embodiments antiferromagnetic exchange layer 116 is nickel-manganese (NiMn) and has a thickness between about 200 Å and about 300 Å.

As shown in FIG. 5, after lift-off of photoresist material 106, the conductor and antiferromagnetic exchange layers are removed from central region 108, but remain in left and right exchange/conductor regions 110 and 112. As denoted in FIG. 5 and subsequent Figures, conductor layer 114 is identified as layer 114L and layer 114R in left and right regions 110 and 112, respectively. Likewise, antiferromagnetic exchange layer 116 is identified as layer 116L and 116R in regions 110 and 112, respectively. However, for ease of discussion when referring to the conductor and antiferromagnetic exchange layers in both regions, these layers are jointly referred to as layers 114 and 116.

Conductor layer 114 provides a low resistance connection from the first sensor (initially shown in FIG. 6) to external electronic circuitry 140 (shown in FIG. 14). Antiferromagnetic exchange layer 116 is for the suppression of magnetic domains in the first sensor in order to minimize unwanted Barkhausen noise. The distance between the left and right conductor/exchange layers 114L/116L and 114R/116R defines width $W_A$ of central or active region 108 for the first sensor.

Figure 6:
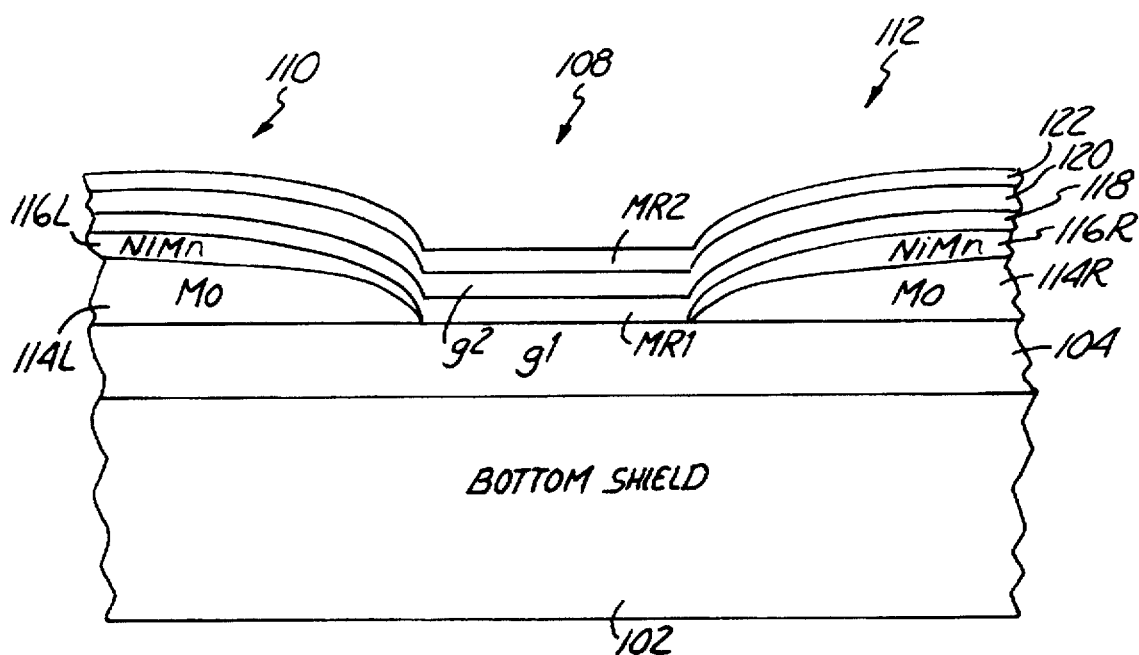

Next, as shown in FIG. 6, a first sensor layer 118, an insulating spacer layer 120, and a second sensor layer 122 are deposited in a single vacuum deposition run, and without breaking vacuum. By depositing all three layers during the same deposition run, process variations and material property mismatches are minimized. In depositing this tri-layer, first MR sensor layer 118 is deposited such that it covers layer 104 of gap material in central region 108, and such that it covers at least portions of antiferromagnetic exchange layer 116 in left and right regions 110 and 112, respectively. Next, layer 120 of electrically insulating gap or spacer material is deposited on top of sensor layer 118. Then, layer 122 of MR sensor material is deposited on top of spacer layer 120. Spacer layer 120 serves to electrically isolate sensor layers 118 and 122 from each other. Also, the thickness of spacer layer 120 can be controlled to establish a desired distance between layers 118 and 122 to properly bias the sensor.

Sensor layers 118 and 122 function as the first and second MR elements of DMR sensor 100. While a variety of materials can be used as layers 118, 120 and 122, in preferred embodiments, layers 118 and 122 of MR material are NiFe, and spacer layer 120 is $SiO_2$. Other insulating materials can be used for spacer layer 120, but any such alternate material is preferably removable using ion mil etching (dry etch). As discussed below in greater detail, the method of the present invention is particularly adapted for using an NiFe sensor layer 118 with a NiMn exchange layer 116 and a Mo conductor layer 114. In some preferred embodiments, sensor layers 118 and 122 each have a thickness of between about 100 Å and 300 Å. Spacer layer 120 preferably has a thickness of between about 100 Å and 1000 Å.

Figure 7:
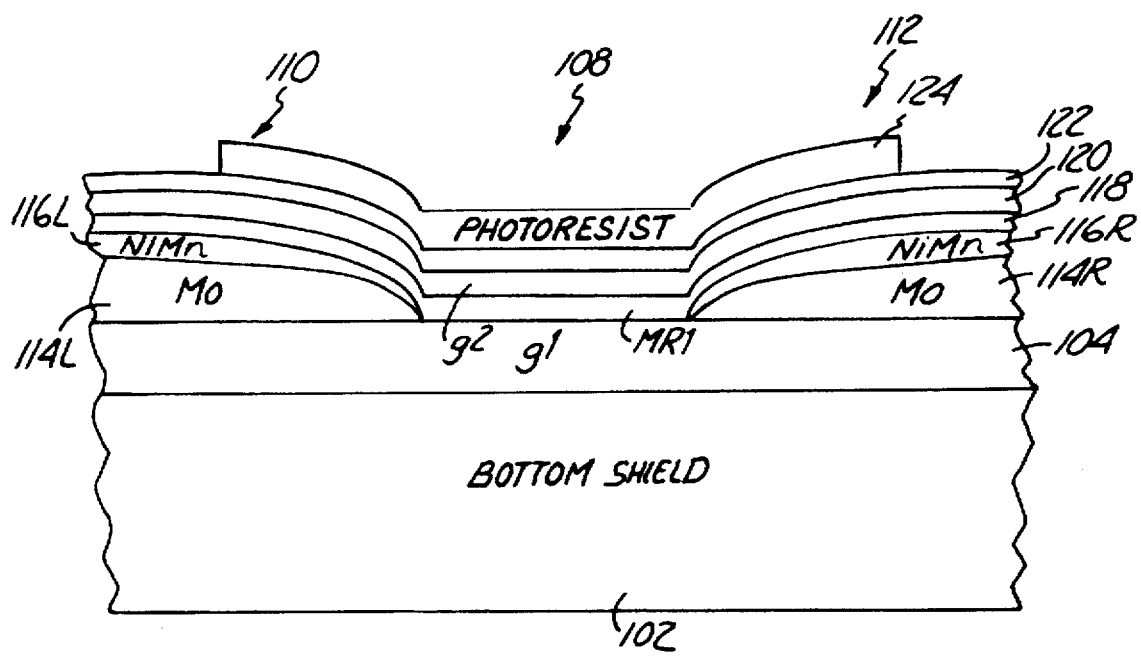
Figure 8:
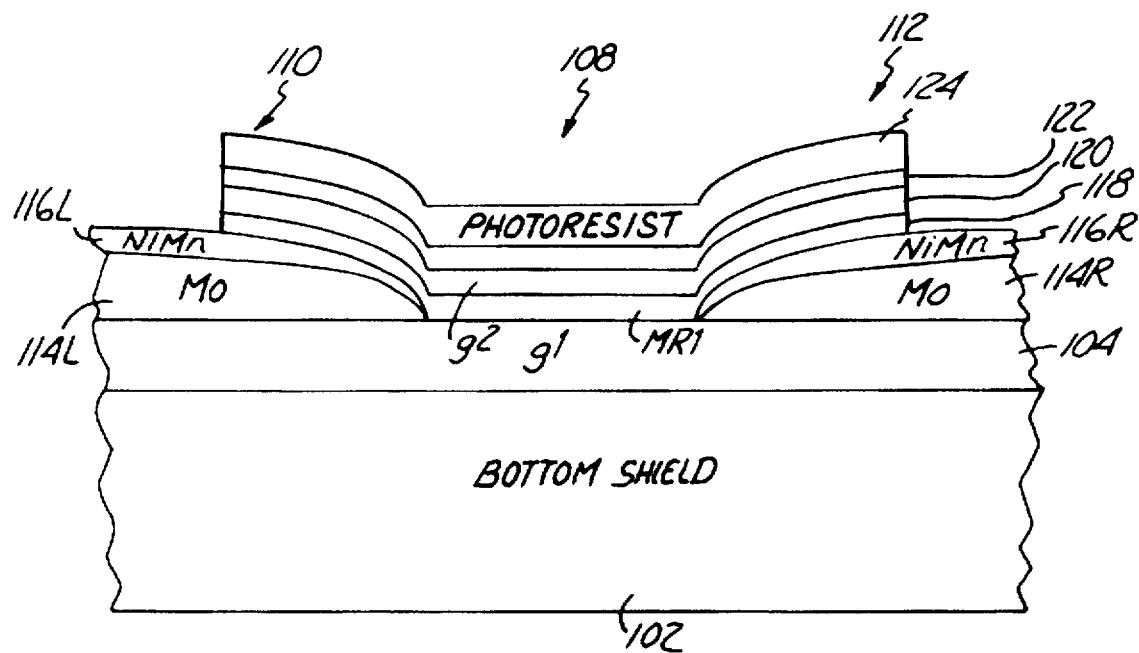

After deposition of the first and second sensors and the insulating spacer layer as shown in FIG. 6, the tri-layer (layers 118, 120 and 122) is simultaneously patterned to the desired geometry by photomasking and ion milling. This is illustrated in FIGS. 7 and 8. As can be seen in FIG. 7, photoresist 124 is coated and patterned on top of sensor layer 122 to form a photomask having the desired sensor geometry. Photoresist 124 is placed on top of sensor layer 122 over an area larger than central or active region 108, such that it covers layer 122 in portions of regions 110 and 112 as well. Next, ion milling is used to remove portions of layers 118, 120 and 122 in regions 110 and 112 which are not covered by photoresist 124. The result of the ion milling is illustrated in FIG. 8. Preferably, the process is controlled such that very little of antiferromagnetic exchange layer 116 is removed by the ion milling. By simultaneously patterning layers 118, 120 and 122, sensor-to-sensor geometrical mismatches or misalignments are minimized. As used herein, the phrase "simultaneously patterned" is intended to indicate that layers 118, 120 and 122 are patterned using a single photomasking step and ion milling steps.

Figure 9:
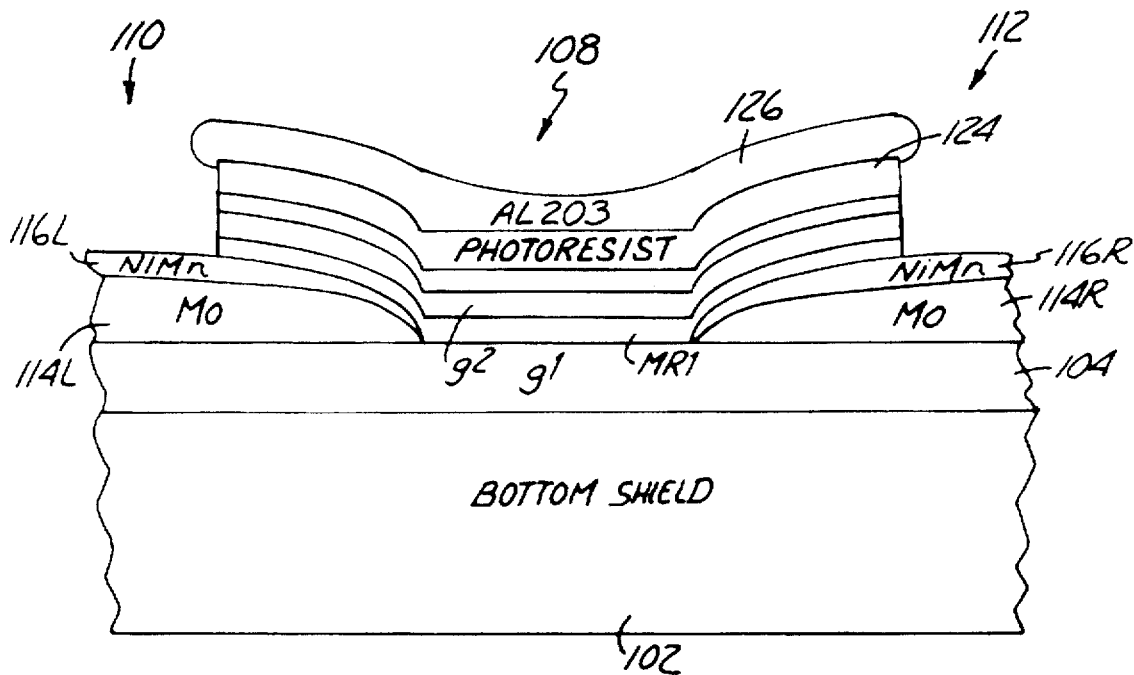
Figure 10:
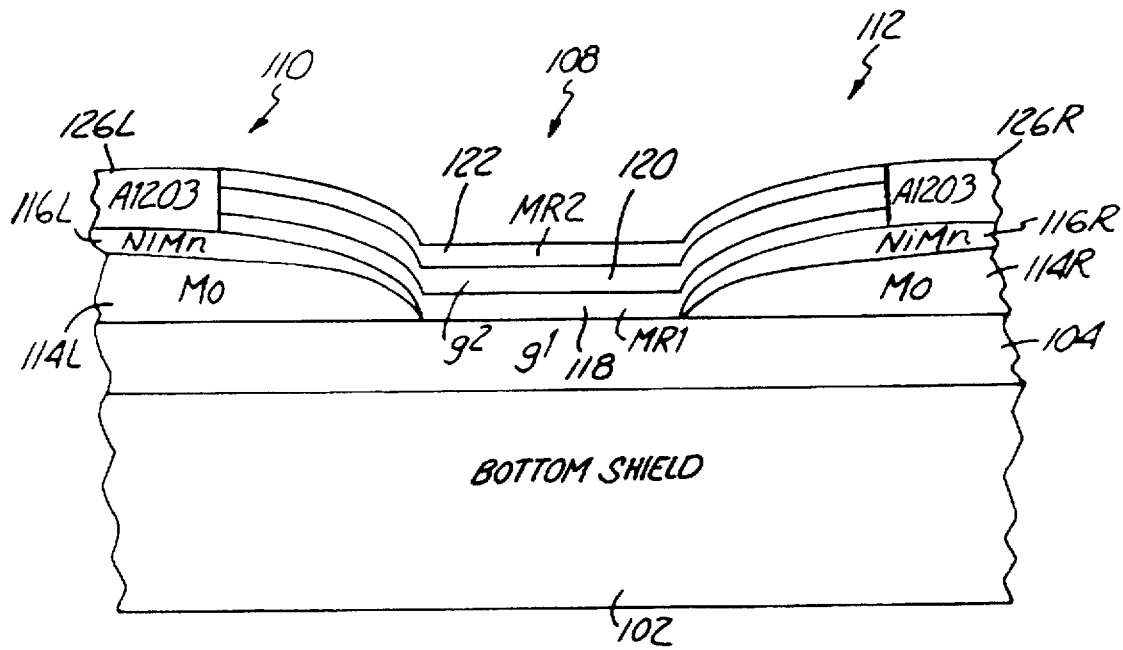

After patterning sensor layers 118 and 122 and spacer layer 120 using the photomask and ion mill steps, layer 126 of a electrically insulating material is deposited. This is illustrated in FIGS. 9 and 10. The insulating material used in layer 126 can be any of a variety of materials, but in preferred embodiments is $Al_2O_3$. As shown in FIG. 9, layer 126 of $Al_2O_3$ is deposited on top of photoresist or photomask 124 and, in portions of regions 110 and 112 where the tri-layer has been removed by ion milling, on top of antiferromagnetic exchange layer 116. Next, a lift-off process is used to remove photoresist 124 and the portions of layer 126 deposited on top of photoresist 124, leaving layer 126 (illustrated as 126L and 126R) only in the outer edges of regions 110 and 112. FIG. 10 illustrates DMR sensor 100 after lift-off of photoresist 124 and of the corresponding portions of layer 126.

Figure 11:
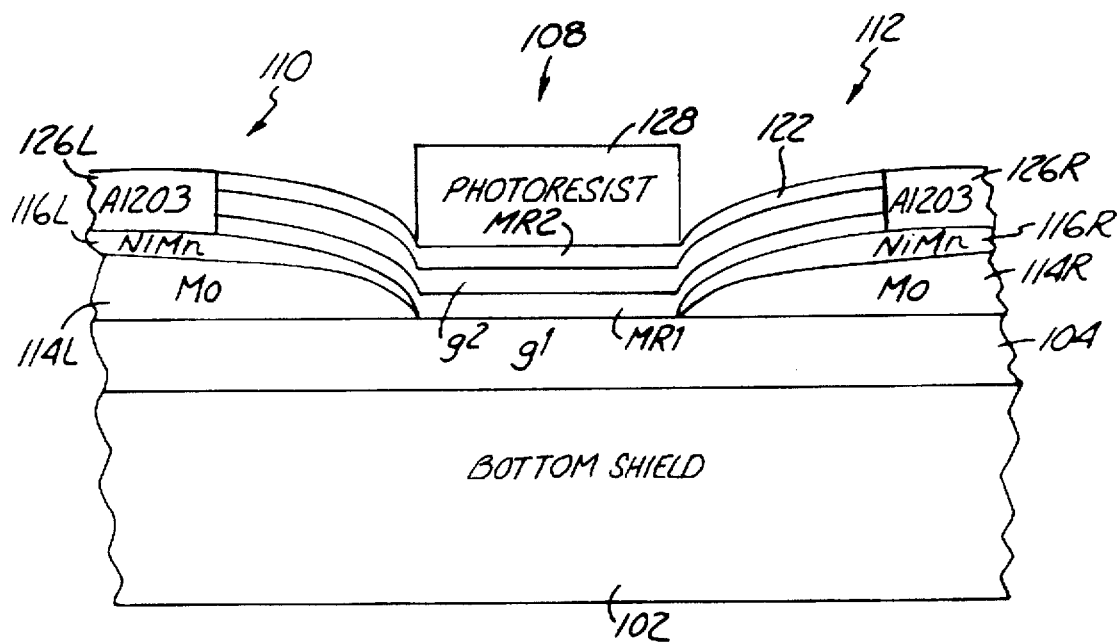
Figure 12:
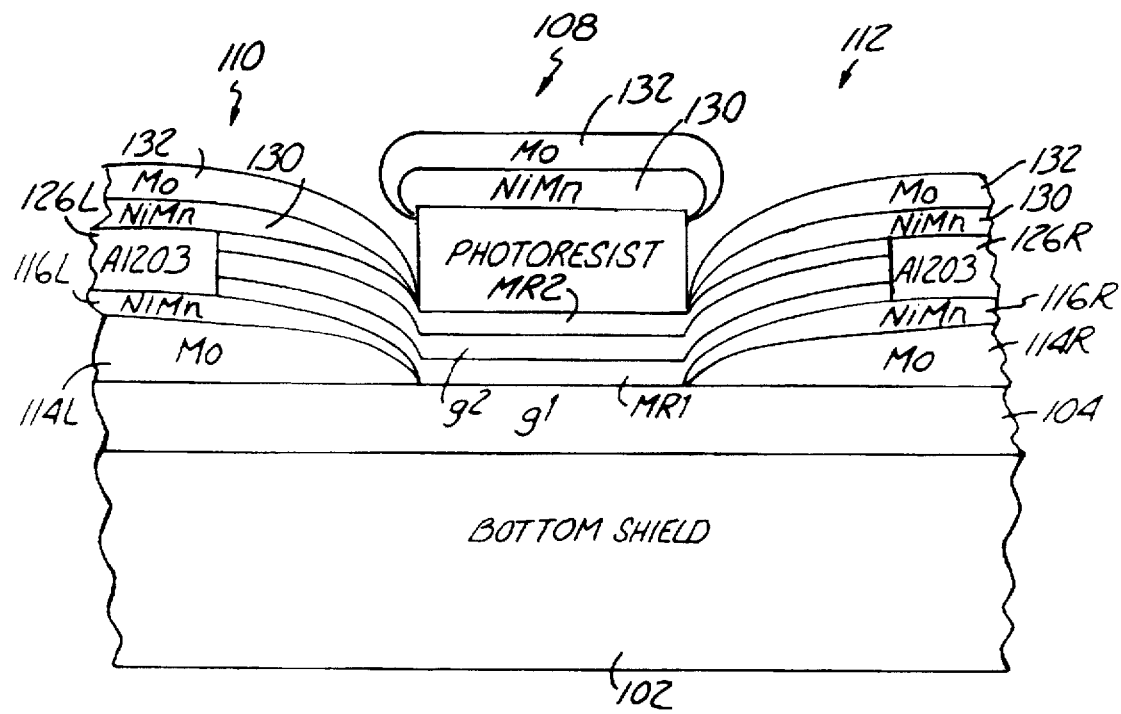
Figure 13:
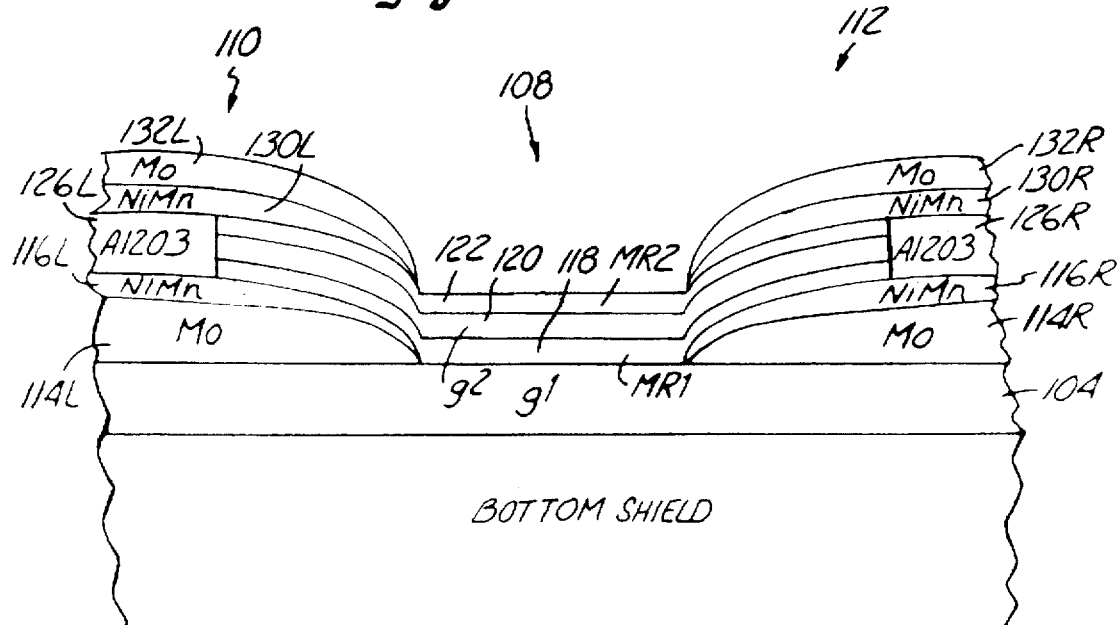
Figure 14:
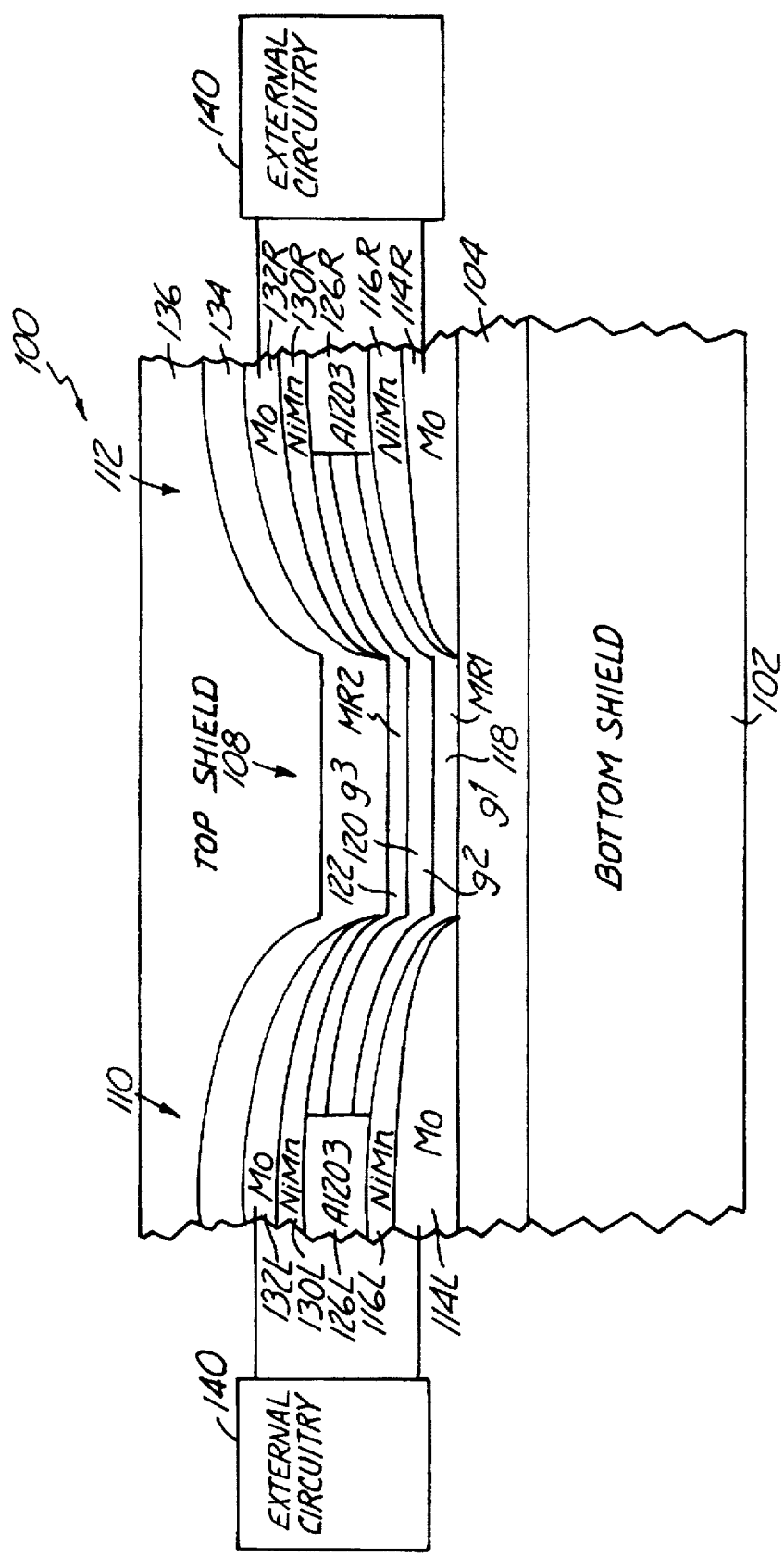
FIG. 14 is a diagrammatic view which illustrates additional steps of the method of fabricating DMR sensors illustrated in FIGS. 1–13, and which illustrates portions of a completed DMR sensor.

After depositing layer 126 of electrically insulating material, an additional antiferromagnetic exchange layer and conductor layer are patterned with a photomask and lift-off process as illustrated in FIGS. 11, 12 and 13. First, as illustrated in FIG. 11, photoresist 128 is placed on magnetoresistive layer 122 in central or active region 108. Next, as illustrated in FIG. 12, layer 130 of antiferromagnetic exchange material is deposited throughout regions 108, 110 and 112. Then, as is also illustrated in FIG. 12, layer 132 of conductive material is deposited on top of layer 130 of antiferromagnetic exchange material. Layers 130 and 132 provide functions for sensor layer 122 equivalent to those provided by layers 116 and 114 for sensor layer 118. Layer 130 of antiferromagnetic exchange material stabilizes the magnetic domains in layer 122 of magnetoresistive material. Conductor layer 132 provides a low resistance contact from the sensor to layer 122 to external circuitry 140 (illustrated in FIG. 14). As in the case with layers 116 and 114, layers 130 and 132 are preferably NiMn and Mo, respectively. Layers 130 and 132 also preferably have the same or similar thicknesses as layers 116 and 114, respectively. However, other known materials can be used as well. Note that the sequence of deposition of conductor layer 132 and exchange layer 130 is reversed in order from that used to deposit layers 114 and 116.

As illustrated in FIG. 13, layers 130 and 132 are removed from active region 108 using a lift-off process which removes photoresist 128 and the corresponding portions of layers 130 and 132. For clarity sake, in region 110, this antiferromagnetic exchange layer is labeled 130L and this conductor layer is labeled 132L. Likewise, in region 112, this antiferromagnetic exchange layer is labeled 130R and this conductor layer is labeled 132R.

As illustrated in FIG. 14, layer 134 of insulating gap material is deposited on top of conductor layer 132 in regions 110 and 112 of DMR sensor 100, and on top of sensor layer 122 in active region 108 of sensor 100. Preferably, layer 134 is $Al_2O_3$ and has a thickness of about 900 Å. Finally, top shield 136 of soft magnetic material is plated on top of insulating gap layer 134. In preferred embodiments, top shield 136 is Sendust™ or NiFe having a thickness of about 3.0–3.5 µm.

The process or method of fabricating DMR sensors in accordance with the present invention provides a number of advantages over conventional methods of fabricating DMR sensors. First, because the first and second magnetoresistive sensor layers are deposited during the same run from the same target and under the same sputtering conditions, variations in the film properties are minimized. However, the insulating spacer target, used to deposit spacer layer 120, must then be located within the same sputtering system. An additional advantage results from the fact that simultaneous ion mill patterning of first magnetoresistive sensor layer 118, spacer layer 120, and second magnetoresistive sensor layer 122 guarantees proper alignment between the first and second magnetoresistive sensor layers along the periphery of the patterned geometry. This in turn minimizes sensor height mismatches. However, it must be noted that simultaneous ion mill patterning of the first and second magnetoresistive sensor layers and the spacer layer can result in conductive redeposition on the periphery which increases the risk of electrical shorts between sensor layers 118 and 122. This problem can be solved using a 2-step ion mill process which includes a regular low angle ion mill step to shape the edge, followed by a short ion mill step at high angle to eliminate any conducting redeposition materials.

The reverse order of deposition of antiferromagnetic exchange layer 130 and conductor layer 132, in comparison with the order of deposition of layers 114 and 116, is required because the antiferromagnetic layer must be in contact with the magnetoresistive sensor for effective suppression of magnetic domains to be achieved. The effectiveness of the exchange layer in suppressing magnetic domains in the sensor layer is also dependent upon the sequence of deposition for the exchange layer and sensor. The deposition sequence of the sensor layer and then antiferromagnetic material on top of the sensor layer, as illustrated in FIGS. 11–13 for layers 122 and 130, has been shown to produce sufficient suppression of magnetic domains in sensor layer 122.

The order of deposition used with first sensor layer 118 and antiferromagnetic layer 116 requires a proper underlayer or seedlayer material to establish the desired properties in the antiferromagnetic layer 116. The Mo conductor material preferably used in layer 114 has been found to be a beneficial underlayer material for this purpose. Without a proper underlayer to facilitate the exchange coupling between layers 116 and 118, conventional DMR fabrication processes required that both NiMn antiferromagnetic layers be deposited on top of their corresponding NiFe sensor layer. This in turn necessitates that the two sensor layers be deposited and patterned separate from one another, introducing variations and misalignment. In preferred embodiments, layer 114 of Mo serves both as a conductor layer for coupling sensor 118 to external electronic circuitry and as an underlayer used to achieve sufficient antiferromagnetic exchange coupling between antiferromagnetic layer 116 and sensor layer 118. However, in the alternative a separate conductor layer and Mo underlayer can be used.

Although the present invention has been described with reference to preferred embodiments, workers skilled in the art will recognize that changes may be made in form and detail without departing from the spirit and scope of the invention. For example, while ion milling is the preferred manner of defining the sensor, other methods could be used.

What is claimed is:

1. A method of fabricating a dual magnetoresistive (DMR) sensor, the method comprising:

forming a first conductor layer and a first antiferromagnetic layer on top of a first gap layer in wing regions adjacent an active region, wherein the first antiferromagnetic layer is formed on top of the first conductor layer;

depositing a first magnetoresistive (MR) sensor layer, an electrically insulating spacer layer and a second MR sensor layer on top of the first antiferromagnetic layer in the wing regions and on top of the first gap layer in the active region, wherein the first MR sensor layer, the spacer layer and the second MR sensor layer are all deposited in a single vacuum deposition run, wherein the spacer layer is deposited on top of the first MR sensor layer, and wherein the second MR sensor layer is deposited on top of the spacer layer;

simultaneously patterning the first MR sensor layer, the spacer layer and the second MR sensor layer to a desired geometry by photomasking and ion milling; and forming a second conductor layer and a second antiferromagnetic layer on top of the second MR sensor layer in the wing regions.

2. The method of claim 1, wherein forming the first conductor layer and the first antiferromagnetic layer on top of the first gap layer further comprises forming the first conductor layer using molybdenum (Mo) and forming the first antiferromagnetic layer using NiMn such that the first NiMn antiferromagnetic layer is formed directly on top of the first Mo conductor layer.

3. The method of claim 2, wherein forming the first conductor layer and the first antiferromagnetic layer on top of the first gap layer further comprises patterning the first Mo conductor layer and the first NiMn antiferromagnetic layer using a photomasking and lift-off process.

4. The method of claim 2, wherein simultaneously patterning the first MR sensor layer, the spacer layer and the second MR sensor layer to the desired geometry by photomasking and ion milling further comprises patterning all of the first MR sensor layer, the spacer layer and the second MR sensor layer to the desired geometry using a single photomasking and ion mill operation.

5. The method of claim 4, wherein simultaneously patterning the first MR sensor layer, the spacer layer and the second MR sensor layer to the desired geometry further comprises patterning such that the first MR sensor layer, the spacer layer and the second MR sensor layer cover the first gap layer in the active region and portions of the first antiferromagnetic layer in the wing regions.

6. The method of claim 5, and before the step of forming the second conductor layer and the second antiferromagnetic layer on top of the second MR sensor layer in the wing regions, further comprising forming a layer of insulating material on top of the first layer of antiferromagnetic material in the wing regions and adjacent to the first MR sensor layer, the spacer layer and the second MR sensor layer.

7. The method of claim 6, wherein forming the second conductor layer and the second antiferromagnetic layer further comprises forming the second antiferromagnetic layer using NiMn and the second conductor layer using Mo such that the second NiMn antiferromagnetic layer is formed directly on top of the second MR sensor layer in the wing regions and such that the second Mo conductor layer is formed directly on top of the second NiMn antiferromagnetic layer.

8. A method of fabricating a dual magnetoresistive (DMR) sensor, comprising:
   forming a first layer of molybdenum (Mo) in wing regions of the DMR sensor;
   forming a first NiMn antiferromagnetic layer on top of the first layer of Mo in the wing regions of the DMR sensor;
   forming a first NiFe sensor layer in an active region of the DMR sensor and on top of the first NiMn antiferromagnetic layer in the wing regions of the DMR sensor;
   forming a spacer layer on top of the first NiFe sensor layer;
   forming a second NiFe sensor layer on top of the spacer layer; and
   forming a second NiMn antiferromagnetic layer on top of the second NiFe sensor layer in the wing regions of the DMR sensor.

9. The method of claim 8, wherein the step of forming the first layer of Mo further comprises forming the first layer of Mo which functions both as a first conductor for coupling the first NiFe sensor layer to external circuitry and as an underlayer for enhancing exchange coupling between the first NiMn antiferromagnetic layer and the first NiFe sensor layer.

10. The method of claim 8, wherein the steps of forming the first NiFe sensor layer, forming the spacer layer and forming the second NiFe sensor layer together comprise:
   depositing the first NiFe sensor layer, the spacer layer and the second NiFe sensor layer in the active region and on top of the first NiMn antiferromagnetic layer in the wing regions using a single vacuum deposition run without breaking vacuum; and
   simultaneously patterning the first NiFe sensor layer, the spacer layer and the second NiFe sensor layer to a desired geometry using a photomask and ion milling.

11. The method of claim 10, wherein forming the first layer of Mo further comprises forming the first layer of Mo on top of a first gap layer the wing regions of the DMR sensor.

12. The method of claim 11, wherein forming the first layer of Mo and the first NiMn antiferromagnetic layer further comprises patterning the first layer of Mo and the first NiMn antiferromagnetic layer using a photomask and lift-off process.

13. The method of claim 8 and after the step of forming the second NiFe sensor layer, further comprising the step of forming an insulating layer adjacent the first NiFe sensor layer, the spacer layer and the second NiFe sensor layer.

* * * * *

UNITED STATES PATENT AND TRADEMARK OFFICE
CERTIFICATE OF CORRECTION

PATENT NO.    : 5,721,008
DATED         : February 24, 1998
INVENTOR(S)   : Huang et al.

It is certified that error appears in the above-identified patent and that said Letters Patent is hereby corrected as shown below:

<u>Title page,</u>
Should list provisional application as follows:

-- Related U.S. Application Data
[60] Provisional application No. 60/028,497, filed on Oct. 15, 1996 --

Signed and Sealed this

Twenty-third Day of September, 2003

JAMES E. ROGAN
*Director of the United States Patent and Trademark Office*